United States Patent
Kim et al.

(10) Patent No.: US 10,896,649 B2
(45) Date of Patent: Jan. 19, 2021

(54) LIQUID CRYSTAL DISPLAY PANEL

(71) Applicant: Samsung Display Co., Ltd., Yongin-Si (KR)

(72) Inventors: Jang-Il Kim, Asan-si (KR); Sei-yong Park, Suwon-si (KR); Yongdoo Park, Jeonju-si (KR); Joonggun Chong, Yongin-si (KR); Sunghee Hong, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 16/798,788

(22) Filed: Feb. 24, 2020

(65) Prior Publication Data

US 2020/0193922 A1    Jun. 18, 2020

Related U.S. Application Data

(62) Division of application No. 14/572,992, filed on Dec. 17, 2014, now Pat. No. 10,607,555.

(30) Foreign Application Priority Data

Mar. 11, 2014    (KR) .................. 10-2014-0028444

(51) Int. Cl.
    *G09G 5/18*     (2006.01)
    *G09G 3/36*     (2006.01)
    *G02F 1/133*    (2006.01)

(52) U.S. Cl.
    CPC ........... *G09G 3/3611* (2013.01); *G02F 1/133* (2013.01); *G09G 3/3677* (2013.01); *G09G 5/18* (2013.01); *G09G 2300/0426* (2013.01); *G09G 2300/0443* (2013.01)

(58) Field of Classification Search
    CPC .................................. G09G 2300/0823
    See application file for complete search history.

(56) References Cited

U.S. PATENT DOCUMENTS

| 8,866,715 B2 | 10/2014 | Tsubata |
| 9,213,209 B2 | 12/2015 | Chang et al. |
| 2006/0050033 A1 | 3/2006 | Asao et al. |
| 2006/0077195 A1 | 4/2006 | Kageyama et al. |
| 2009/0046107 A1 | 2/2009 | Asao et al. |

(Continued)

FOREIGN PATENT DOCUMENTS

| JP | 2003-303831 A | 10/2003 |
| KR | 1020040017050 A | 2/2004 |

(Continued)

OTHER PUBLICATIONS

Korean Office Action for Application No. 10-2014-0028444 dated Jan. 15, 2020 enumerating the above references in the Korean Office Action.

*Primary Examiner* — William Boddie
*Assistant Examiner* — Jeffrey Parker
(74) *Attorney, Agent, or Firm* — Cantor Colburn LLP

(57) ABSTRACT

A liquid crystal display panel includes a first odd source electrode and a first odd drain electrode on a first odd semiconductor layer have the same shapes as a first even drain electrode and a first even source electrode on a first even semiconductor layer, and when viewed in a plan view, a shape of a even pixel, except for a first even transistor, has substantially inversion symmetry with a shape of a odd pixel about a point on a virtual line parallel to a second direction.

8 Claims, 11 Drawing Sheets

(56) References Cited

U.S. PATENT DOCUMENTS

| | | | |
|---|---|---|---|
| 2009/0195487 A1 | 8/2009 | Shimoshikiryoh et al. |
| 2009/0322660 A1 | 12/2009 | Chung et al. |
| 2010/0220116 A1 | 9/2010 | Liao et al. |
| 2012/0008059 A1 | 1/2012 | Kim et al. |
| 2012/0075542 A1 | 3/2012 | Kim et al. |
| 2012/0194774 A1 | 8/2012 | Jung et al. |
| 2013/0083263 A1 | 4/2013 | Kim et al. |
| 2014/0131556 A1 | 5/2014 | Abukawa et al. |

FOREIGN PATENT DOCUMENTS

| | | |
|---|---|---|
| KR | 1020070002221 A | 1/2007 |
| KR | 1020130044097 A | 5/2013 |
| KR | 1020130053919 A | 5/2013 |
| KR | 1020140021105 A | 2/2014 |
| WO | 2011010417 A1 | 1/2011 |

LIQUID CRYSTAL DISPLAY PANEL

This application is a divisional of U.S. patent application Ser. No. 14/572,992, filed on Dec. 17, 2014, which claims priority to Korean Patent Application No. 10-2014-0028444, filed on Mar. 11, 2014, and all the benefits accruing therefrom under 35 U.S.C. § 119, the entire contents of which are hereby incorporated by reference.

BACKGROUND

1. Field

Exemplary embodiments of the invention relate to a display panel, and in particular, to a liquid crystal display ("LCD") panel.

2. Description of the Related Art

Generally, an LCD panel has two substrates and a liquid crystal layer interposed therebetween. An intensity of light passing through the substrates is controlled by changing a magnitude of an electric field applied to the liquid crystal layer, and this is used to display a desired image on the LCD panel.

For an LCD panel of vertical align ("VA") mode, liquid crystals are aligned to be perpendicular (i.e., homeotropic) to one of the substrates and have a negative permittivity. Due to its high contrast ratio and wide viewing angle, the LCD panel of VA mode is being widely used.

SUMMARY

Exemplary embodiments of the invention provide a liquid crystal display ("LCD") panel with effectively reduced horizontal line failure.

According to exemplary embodiments of the invention, an LCD panel may include first and second data lines spaced apart from each other in a first direction, the first and second data lines extending along a second direction perpendicular to the first direction, first and second gate lines spaced apart from each other in the second direction, the first and second gate lines extending along the first direction, an odd pixel interposed between the first and second data lines and connected to the first gate line and the first data line, the odd pixel including a first odd transistor with a first odd source electrode, a first odd drain electrode, and a first odd semiconductor layer, and an even pixel interposed between the first and second data lines and connected to the second gate line and the second data line, the even pixel including a first even transistor with a first even source electrode, a first even drain electrode, and a first even semiconductor layer. The first odd source electrode and the first odd drain electrode on the first odd semiconductor layer may have the same shapes as the first even drain electrode and the first even source electrode on the first even semiconductor layer, respectively, and when viewed in a plan view, a shape of the even pixel, except for the first even transistor, may have substantially inversion symmetry with a shape of the odd pixel, except for the first odd transistor, about a virtual line parallel to the second direction.

In exemplary embodiments, the first odd semiconductor layer may include an odd channel, and the first even semiconductor layer may include an even channel, whose shape may be the same as that of the odd channel.

In exemplary embodiments, the first odd source electrode may extend along the first direction, the first odd drain electrode may be spaced apart from the first odd source electrode in the second direction to extend along the first direction, and the odd channel may have an 'I'-shape extending toward the first direction, and the first even drain electrode may extend along the first direction, the first even source electrode may be spaced apart from the first even drain electrode in the second direction to extend along the first direction, and the even channel may have the 'I'-shape extending toward the first direction.

In exemplary embodiments, the odd pixel may include a first odd sub pixel receiving a first data voltage from the first data line, and a second odd sub pixel displaying gradation lower than the first odd sub pixel and including the first odd transistor. The second odd sub pixel further may include a second odd transistor electrically connected to the first gate line, the first data line, and the first odd transistor, and the first odd transistor may be electrically connected to the first gate line, a storage electrode, and the second odd transistor, the even pixel may include a first even sub pixel receiving a second data voltage from the second data line, and a second even sub pixel displaying gradation lower than the first even sub pixel and including the first even transistor. The second even sub pixel further may include a second even transistor electrically connected to the second gate line, the second data line, and the first even transistor, and the first even transistor may be electrically connected to the second gate line, the storage electrode, and the second even transistor.

In exemplary embodiments, the first odd source electrode may include an end portion, which may be electrically connected to the storage electrode, and another end portion, which extends from the end portion thereof toward a third direction opposite the first direction and may contact the first odd semiconductor layer, the first odd drain electrode may include an end portion, which may be electrically connected to the second odd transistor, and another end portion, which extends from the end portion thereof toward the first direction and may contact the first odd semiconductor layer, the first even source electrode may include an end portion, which may be electrically connected to the storage electrode, and another end portion, which extends from the end portion thereof toward the first direction and may contact the first even semiconductor layer, the first even drain electrode may include an end portion, which may be electrically connected to the second even transistor, and another end portion, which extends from the end portion thereof toward the third direction and may contact the first even semiconductor layer.

In exemplary embodiments, the first odd transistor may be disposed adjacent to the second data line, the second odd transistor may be disposed adjacent to the first data line, the first even transistor may be disposed adjacent to the first data line, and the second even transistor may be disposed adjacent to the second data line.

In exemplary embodiments, the odd pixel further may include a third odd transistor electrically connected to the first gate line, the first data line, and the first odd sub pixel, the even pixel further may include a third even transistor electrically connected to the second gate line, the second data line, and the first even sub pixel.

In exemplary embodiments, the odd and even pixels may be arranged along the second direction.

In exemplary embodiments, the odd pixel may be provided with a first data voltage through the first data line, the even pixel may be provided with a second data voltage, whose polarity is opposite to that of the first data voltage, through the second data line, and the first and second data voltages may be provided to the first and second data lines, respectively, in a column inversion mode.

In exemplary embodiments, the LCD panel further may include an array substrate, a counter substrate facing the array substrate, and a liquid crystal layer interposed between the array substrate and the counter substrate.

In exemplary embodiments, the liquid crystal layer may include liquid crystal molecules with homeotropic alignment and negative dielectric anisotropy.

In exemplary embodiments, each of the odd and even pixels may include a pixel electrode with a pattern defining a plurality of domains, and alignment directions of the liquid crystal molecules may be different between the domains.

According to other exemplary embodiments of the invention, an LCD panel may include first and second data lines spaced apart from each other in a first direction, the first and second data lines extending along a second direction perpendicular to the first direction, first and second gate lines spaced apart from each other in the second direction, the first and second gate lines extending along the first direction, an odd pixel interposed between the first and second data lines and connected to the first gate line and the first data line, the odd pixel including a first odd transistor with a first odd source electrode and a first odd drain electrode, and an even pixel interposed between the first and second data lines and connected to the second gate line and the second data line, the even pixel including a first even transistor with a first even source electrode and a first even drain electrode. The first odd source electrode may include a first horizontal branch portion extending along the first direction and a first vertical branch portion extending from an end portion of the first horizontal branch portion toward the first odd drain electrode, the first odd drain electrode may include a second horizontal branch portion extending along the first direction and a second vertical branch portion extending from an end portion of the second horizontal branch portion toward the first odd source electrode, the first even source electrode may include a third horizontal branch portion extending along the first direction and a third vertical branch portion extending from an end portion of the third horizontal branch portion toward the first even drain electrode, and the first even drain electrode may include a fourth horizontal branch portion extending along the first direction and a fourth vertical branch portion extending from an end portion of the fourth horizontal branch portion toward the first even source electrode.

In exemplary embodiments, the first odd source electrode may have an 'L'-shape structure that is clockwise rotated by 90 degrees, and the first odd drain electrode may have an 'L'-shaped structure that is counterclockwise rotated by 90 degrees and is engaged with the first odd source electrode. The first even source electrode may have an 'L'-shaped structure that is horizontally inverted and is counterclockwise rotated by 90 degrees, and the first even drain electrode may have an 'L'-shaped structure that is horizontally inverted and clockwise rotated by 90 degrees and is engaged with the first even source electrode.

In exemplary embodiments, the odd pixel may include a first odd sub pixel receiving a first data voltage from the first data line, and a second odd sub pixel displaying gradation lower than the first odd sub pixel and including the first odd transistor. The second odd sub pixel further may include a second odd transistor electrically connected to the first gate line, the first data line, and the first odd transistor, and the first odd transistor may be electrically connected to the first gate line, a storage electrode, and the second odd transistor, the even pixel may include a first even sub pixel receiving a second data voltage from the second data line, and a second even sub pixel displaying gradation lower than the first even sub pixel and including the first even transistor. The second even sub pixel further may include a second even transistor electrically connected to the second gate line, the second data line, and the first even transistor, and the first even transistor may be electrically connected to the second gate line, the storage electrode, and the second even transistor.

In exemplary embodiments, the odd pixel further may include a third odd transistor electrically connected to the first gate line, the first data line, and the first odd sub pixel, and the even pixel further may include a third even transistor electrically connected to the second gate line, the second data line, and the first even sub pixel.

In exemplary embodiments, the odd and even pixels may be arranged along the second direction.

In exemplary embodiments, the odd pixel may be provided with a first data voltage through the first data line, the even pixel may be provided with a second data voltage, whose polarity is opposite to that of the first data voltage, through the second data line, and the first and second data voltages may be provided to the first and second data lines, respectively, in a column inversion mode.

In exemplary embodiments, the LCD panel may further include an array substrate, a counter substrate facing the array substrate, and a liquid crystal layer interposed between the array substrate and the counter substrate. The liquid crystal layer may include liquid crystal molecules with homeotropic alignment and negative dielectric anisotropy.

In exemplary embodiments, each of the odd and even pixels may include a pixel electrode with a pattern defining a plurality of domains, and alignment directions of the liquid crystal molecules may be different between the domains.

BRIEF DESCRIPTION OF THE DRAWINGS

Exemplary embodiments will be more clearly understood from the following brief description taken in conjunction with the accompanying drawings. The accompanying drawings represent non-limiting, exemplary embodiments as described herein.

DETAILED DESCRIPTION

Figure 1:
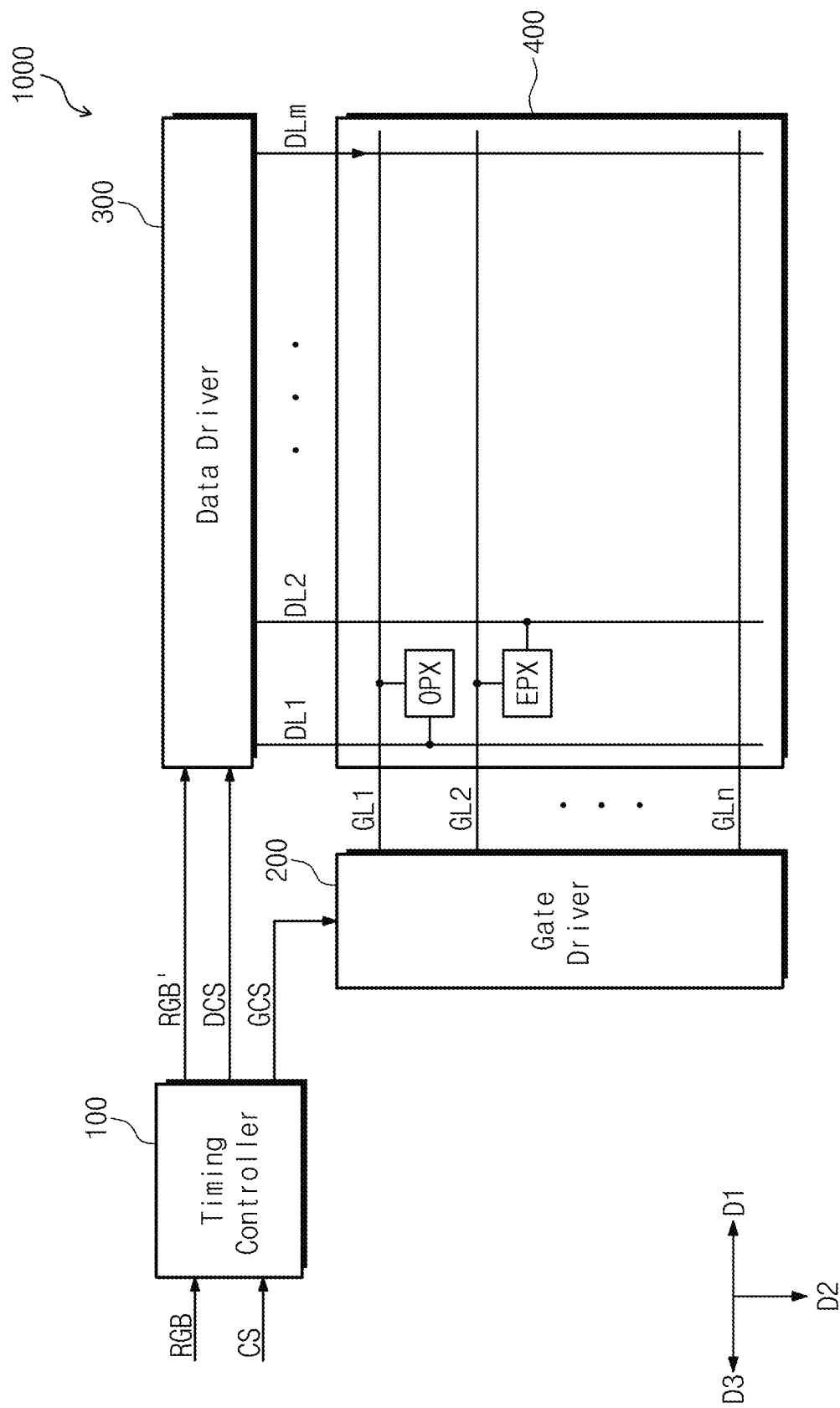
FIG. 1 is a block diagram illustrating an exemplary embodiment of a liquid crystal display ("LCD") device according to the invention.

Exemplary embodiments of the inventions will now be described more fully with reference to the accompanying drawings, in which exemplary embodiments are shown. Exemplary embodiments of the inventions may, however, be embodied in many different forms and should not be construed as being limited to the embodiments set forth herein; rather, these embodiments are provided so that this invention will be thorough and complete, and will fully convey the concept of exemplary embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which exemplary embodiments of the inventions belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a block diagram illustrating a liquid crystal display ("LCD") device according to exemplary embodiments of the invention.

Referring to FIG. 1, an LCD device 1000 according to exemplary embodiments of the invention may include an LCD panel 400 for displaying images, gate and data drivers 200 and 300 for driving the LCD panel 400, and a timing controller 100 controlling the driving operations of the gate and data drivers 200 and 300.

The timing controller 100 may receive image information RGB and a plurality of control signals CS from the outside of the LCD device 1000. The timing controller 100 may produce image data RGB' by converting the image information RGB in such a way that a data format thereof is suitable for interface requirement of the data driver 300 and may provide the image data RGB' to the data driver 300. Further, the timing controller 100 may produce data control signals DCS (for example, output start signals, horizontal start signals, and so forth) and gate control signals GCS (for example, vertical start signals, vertical clock signals, and vertical clock-bar signals, and so forth) based on the plurality of control signals CS. The data control signals DCS may be provided to the data driver 300, and the gate control signals GCS may be provided to the gate driver 200.

The gate driver 200 may output gate signals sequentially to the LCD panel 400 in response to the gate control signals GCS provided from the timing controller 100.

The data driver 300 may convert the image data RGB' to data voltages in response to the data control signals DCS provided from the timing controller 100. The converted data voltages may be output or applied to the LCD panel 400.

The LCD panel 400 may include a plurality of gate lines GL1-GLn, a plurality of data lines DL1-DLm, odd pixels OPX connected to odd gate lines, and even pixels EPX connected to even gate lines.

The plurality of gate lines GL1-GLn may extend parallel to a first direction D1 and may be arranged side by side along a second direction D2 perpendicular to the first direction D1. The plurality of gate lines GL1-GLn may be connected to the gate driver 200 to receive the gate signals from the gate driver 200.

The plurality of data lines DL1-DLm may extend parallel to the second direction D2 and may be arranged side by side along the first direction D1. The plurality of data lines DL1-DLm may be connected to the data driver 300 to receive the data voltages from the data driver 300.

Each of the odd pixels OPX may be connected to a corresponding odd-numbered gate line of the plurality of gate lines GL1-GLn and a corresponding data line of the plurality of data lines DL1-DLm. In an exemplary embodiment, the odd pixel OPX may be disposed between the first and second data lines DL1 and DL2 and may be electrically connected to the first gate line GL1 and the first data line DL1, for example. Each of the odd pixels OPX may be selectively turned-on or turned-off by a gate signal applied thereto. Each of the odd pixels OPX may display gradation corresponding to a data voltage applied thereto, when it is in the turned-on state.

Each of the even pixels EPX may be connected to a corresponding even-numbered gate line of the plurality of gate lines GL1-GLn and a corresponding data line of the plurality of data lines DL1-DLm. In an exemplary embodiment, the even pixel EPX may be disposed between the first and second data lines DL1 and DL2 and may be electrically connected to the second gate line GL2 and the second data line DL2, for example. Each of the even pixels EPX may be selectively turned-on or turned-off by a gate signal applied thereto. Each of the even pixels EPX may display gradation corresponding to a data voltage applied thereto, when it is in the turned-on state.

In an exemplary embodiment, the plurality of data lines DL1-DLm may receive a data voltage provided in a column inversion mode from the data driver 300, for example. In other words, a data voltage applied to a corresponding odd-numbered data line of the plurality of data lines DL1-DLm may have a polarity opposite to that of a data voltage applied to a corresponding even-numbered data line of the plurality of data lines DL1-DLm. In an exemplary embodiment, the first data line DL1 may be applied with a first data voltage with a positive polarity, while the second data line DL2 may be applied with a second data voltage with a negative polarity, for example. Accordingly, in an exemplary embodiment, the odd pixel OPX may receive the first data voltage with the positive polarity from the first data line DL1, and the even pixel EPX may receive the second data voltage with the negative polarity from the second data line DL2, for example. In an exemplary embodiment, polarities of the first and second data voltages may be periodically inverted in a manner synchronized to the gate signals.

According to the above description, the odd and even pixels OPX and EPX may be arranged to have a staggered structure, for example. In an exemplary embodiment, the odd and even pixels OPX and EPX may be arranged along the second direction D2, the odd pixel OPX may be connected to the first data line DL1, which is positioned in a third direction D3 opposite to the first direction D1 relative to the odd pixel OPX, and the even pixel EPX may be connected to the second data line DL2 positioned in the first direction D1 relative to the even pixel EPX, for example. In this case, when the data voltages are provided to the plurality of data lines DL1-DLm through the data driver 300 in the column inversion mode, the odd and even pixels OPX and EPX may be driven in a dot inversion manner, for example, and moreover, it is possible to effectively reduce power loss and heat generation of the data driver 300.

Figure 2:
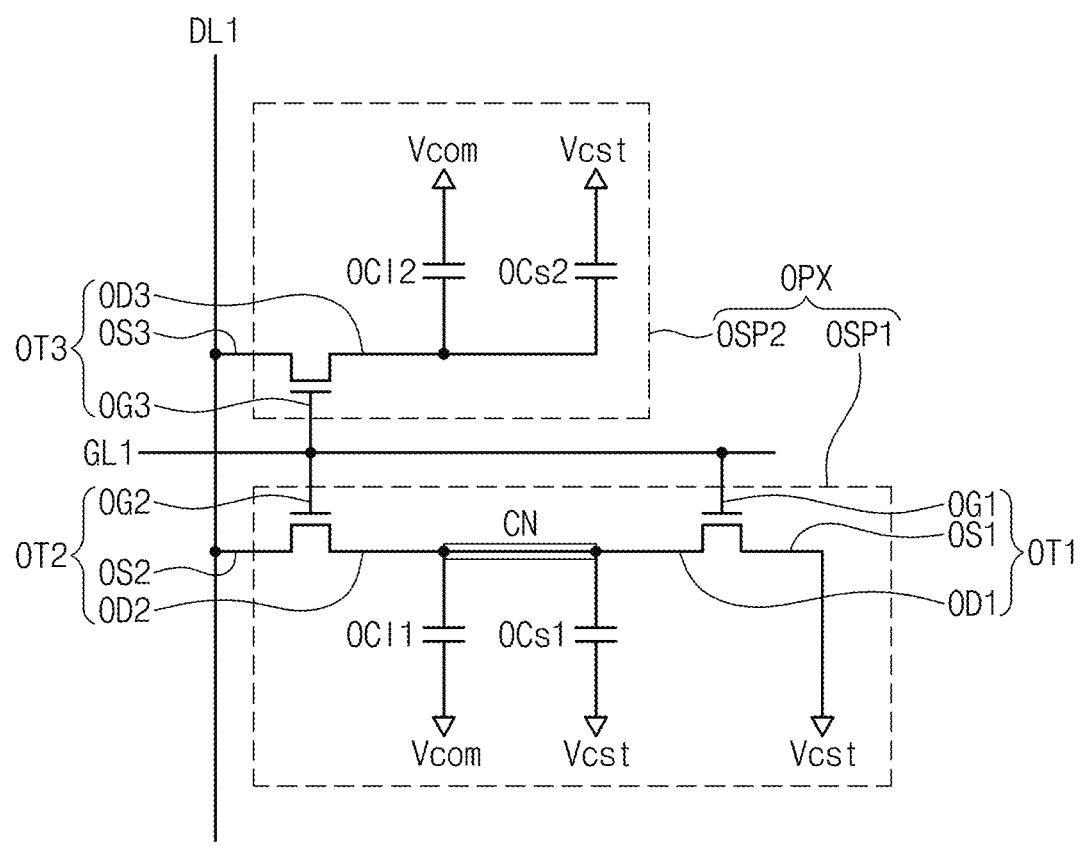
FIG. 2 is a circuit diagram of an odd pixel illustrated in FIG. 1.

FIG. 2 is a circuit diagram of an odd pixel illustrated in FIG. 1.

A circuit diagram of the odd pixel OPX may be the same as that of the even pixel EPX, and thus, only the circuit diagram of the odd pixel OPX will be described without describing the circuit diagram of the even pixel EPX.

Referring to FIG. 2, the odd pixel OPX may include a first odd sub pixel OSP1 and a second odd sub pixel OSP2.

The first odd sub pixel OSP1 may include a first odd transistor OT1, a second odd transistor OT2, a first odd liquid crystal capacitor OC11, and a first odd storage capacitor OCs1. The second odd sub pixel OSP2 may include a third odd transistor OT3, a second odd liquid crystal capacitor OC12, and a second odd storage capacitor OCs2.

The third odd transistor OT3 may include a third odd gate electrode OG3 connected to the first gate line GL1, a third odd source electrode OS3 connected to the first data line DL1, and a third odd drain electrode OD3 connected to the second odd liquid crystal capacitor OC12 and the second odd storage capacitor OCs2.

The second odd liquid crystal capacitor OC12 may include a first electrode connected to the third odd drain electrode OD3, and the second odd liquid crystal capacitor OCL2 may include a second electrode, to which a common voltage Vcom is applied. The second odd storage capacitor OCs2 may include a first electrode connected to the third odd drain electrode OD3, and the second odd storage capacitor OCs2 may include a second electrode, to which a storage voltage Vcst is applied.

The second odd transistor OT2 may include a second odd gate electrode OG2 connected to the first gate line GL1, a second odd source electrode OS2 connected to the first data line DL1, and a second odd drain electrode OD2 connected to the first odd liquid crystal capacitor OC11 and the first odd storage capacitor OCs1.

The first odd transistor OT1 may include a first odd gate electrode OG1 connected to the first gate line GL1, a first odd source electrode OS1 applied with the storage voltage Vcst, and a first odd drain electrode OD1 connected to the second odd drain electrode OD2 of the second odd transistor OT2.

The first odd liquid crystal capacitor OC11 may include a first electrode connected to the first and second odd drain electrodes OD1 and OD2, and the first odd liquid crystal capacitor OC11 may include a second electrode, to which the common voltage Vcom is applied. The first odd storage capacitor OCs1 may include an end portion, which is connected to the first and second odd drain electrodes OD1 and OD2, and another end portion, which is configured to receive the storage voltage Vcst.

The first to third odd transistors OT1-OT3 may be turned on, when a gate signal is applied thereto through the first gate line GL1.

The first data voltage may be provided to the first odd sub pixel OSP1 through the second odd transistor OT2 in the turned-on state, and the storage voltage Vcst may be applied to the first odd sub pixel OSP1 through the first odd transistor OT1 in the turned-on state.

The first data voltage may be a positive voltage or a negative voltage, relative to the storage voltage Vcst. In an exemplary embodiment, the common voltage Vcom may have substantially the same voltage as the storage voltage Vcst, for example.

The first and second odd drain electrodes OD1 and OD2 may be connected to each other at a connection node CN. At the connection node CN, a voltage (hereinafter, referred as to a distribution voltage) may be distributed depending on resistance values of the first and second odd transistors OT1 and OT2 in the turned-on state. In other words, the distribution voltage may range between the storage voltage Vcst provided through the turned-on first odd transistor OT1 and the first data voltage provided through the turned-on second odd transistor OT2.

The first odd liquid crystal capacitor OC11 may be charged with a first pixel voltage corresponding to the difference between the distribution voltage and the common voltage Vcom.

The first data voltage may be applied to the second odd sub pixel OSP2 through the turned-on third odd transistor OT3.

For the second odd liquid crystal capacitor OC12, the second odd liquid crystal capacitor OC12 may be charged with a second pixel voltage corresponding to the difference between the first data voltage and the common voltage Vcom. Accordingly, the second pixel voltage may be charged in the second odd sub pixel OSP2. In other words, the second odd liquid crystal capacitor OC12 may be charged with the second pixel voltage that is greater than the first pixel voltage, for example. Accordingly, the second pixel voltage greater than the first pixel voltage may be charged in the second odd sub pixel OSP2, for example. As a result, gradation of an image to be displayed on the second odd sub pixel OSP2 may be different from that on the first odd sub pixel OSP1.

As described above, since the first and second odd sub pixels OSP1 and OSP2 are configured to be able to display images, whose gradations are different from each other, it is possible to improve the visibility of the odd pixel OPX.

Hereinafter, an LCD panel with the circuit structure of FIG. 2 will be described with reference to FIGS. 3 through 5. For concise description, a previously described element may be identified by a similar or identical reference number without repeating an overlapping description thereof.

Figure 3:
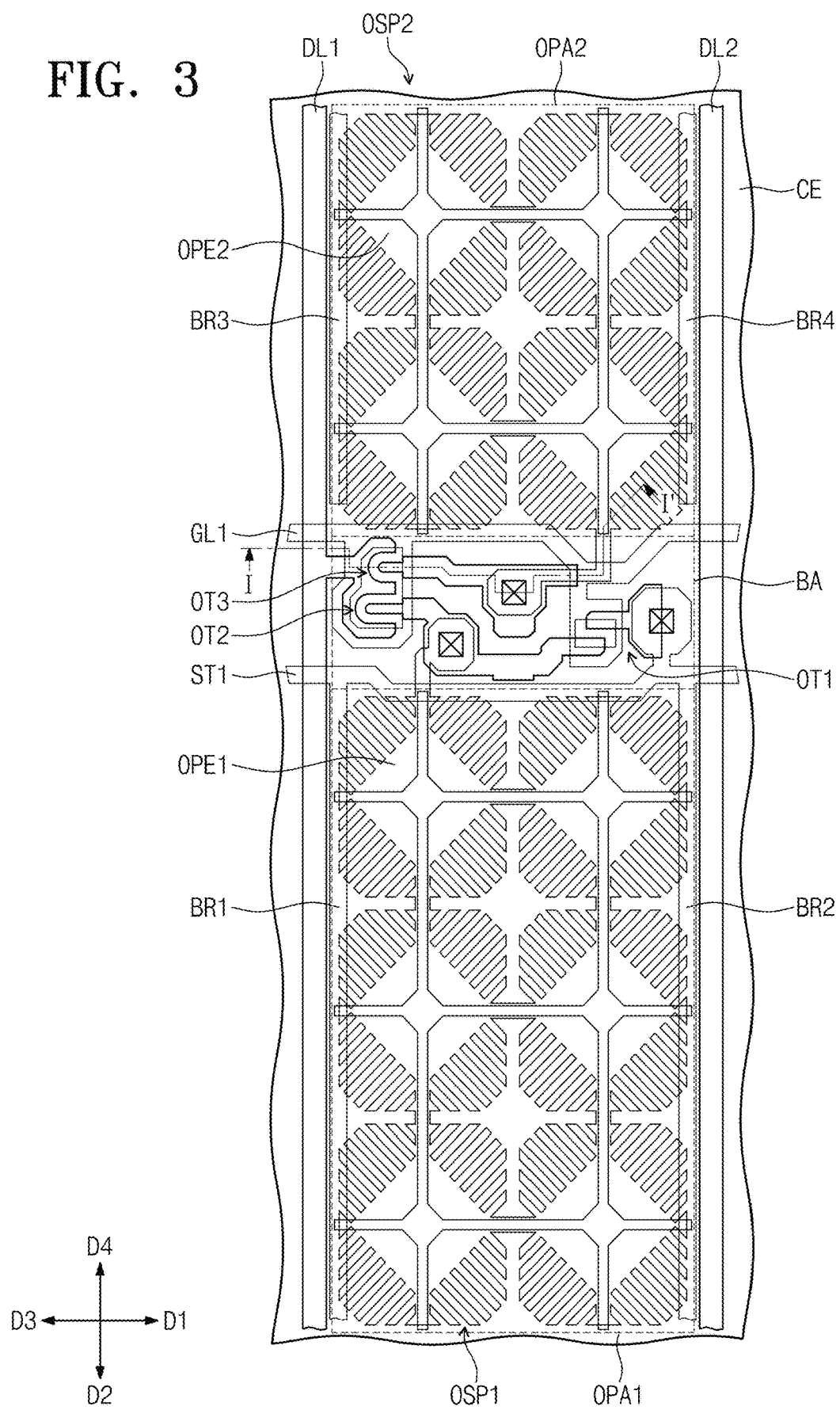
FIG. 3 is a plan view illustrating an exemplary embodiment of an odd pixel of an LCD panel according to the invention.
Figure 4:
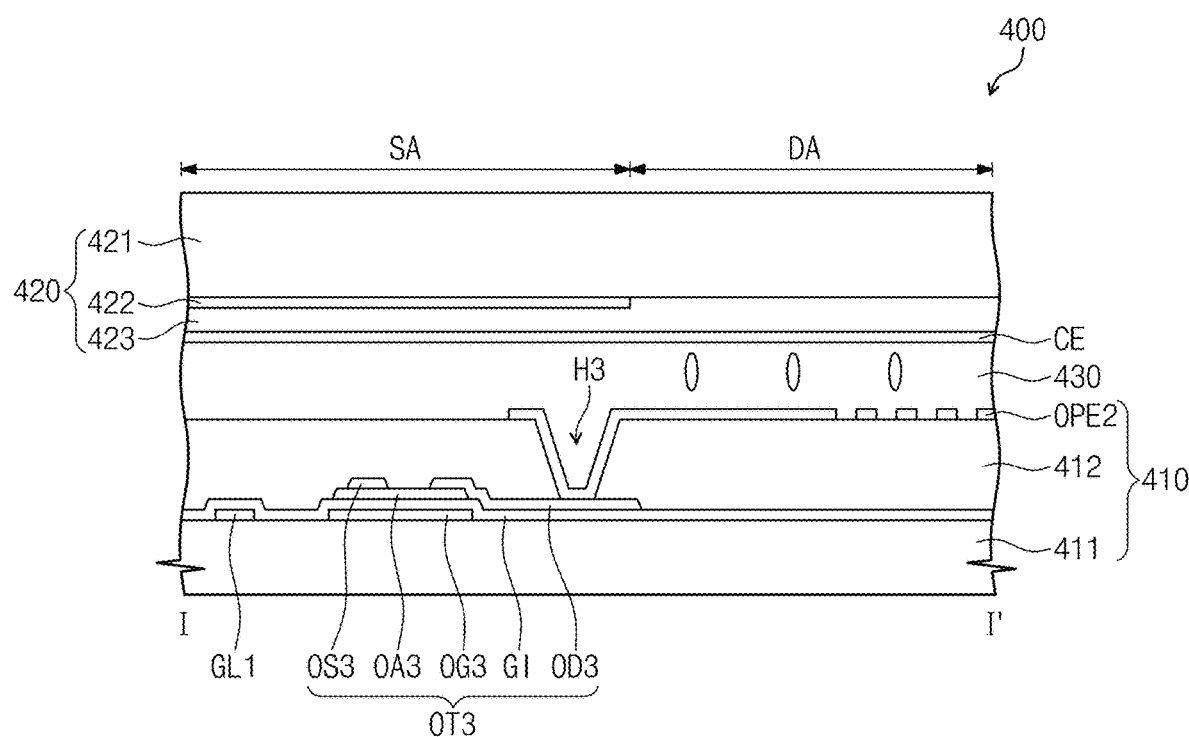
FIG. 4 is a sectional view taken along line I-I' of FIG. 3.

FIG. 3 is a plan view illustrating an odd pixel of an LCD panel according to exemplary embodiments of the invention, and FIG. 4 is a sectional view taken along line I-I' of FIG. 3.

Referring to FIG. 3, the first and second data lines DL1 and DL2 may be spaced apart from each other in the first direction D1 and each of the first and second data lines DL1 and DL2 may extend parallel to the second direction D2. In an exemplary embodiment, the first and second directions D1 and D2 may be row and column directions, respectively. In an exemplary embodiment, the odd pixel OPX may be provided between the first and second data lines DL1 and DL2.

Hereinafter, a region of the first odd sub pixel OSP1 displaying an image will be referred to as a first odd pixel region OPAL A region of the second odd sub pixel OSP2 displaying an image will be referred to as a second odd pixel region OPA2. The first and second odd pixel regions OPA1 and OPA2 may be arranged between the first and second data lines DL1 and DL2 and along the second direction D2.

A region, which is positioned between the first and second odd pixel regions OPA1 and OPA2 adjacent to each other and is elongated in the row direction, will be referred to as a boundary region BA. The first to third odd transistors OT1-OT3 may be disposed on the boundary region BA, and the first gate line GL1 may be elongated along the first direction D1 to cross the boundary region BA.

The first odd sub pixel OSP1 may further include a common electrode CE, a first storage electrode portion, and a first odd pixel electrode OPE1. The second odd sub pixel OSP2 may further include the common electrode CE, a second storage electrode portion, and a second odd pixel electrode OPE2.

The first odd pixel electrode OPE1 may be provided on the first odd pixel region OPA1, and the second odd pixel electrode OPE2 may be provided on the second odd pixel region OPA2. In an exemplary embodiment, the first and second odd pixel electrodes OPE1 and OPE2 may include a transparent conductive material. In the exemplary embodiment, the first and second odd pixel electrodes OPE1 and OPE2 may include at least one of transparent conductive materials, such as indium tin oxide ("ITO"), indium zinc oxide ("IZO"), and indium tin zinc oxide ("ITZO").

The first storage electrode portion may include a first storage line ST1 and first and second branch electrodes BR1 and BR2 diverging and extending from the first storage line ST1. The first storage line ST1 may cross the boundary region BA in the first direction D1. The first branch electrode BR1 may extend along a left side of the first odd pixel region OPA1 toward the second direction D2, and the second branch electrode BR2 may be spaced apart from the first branch electrode BR1 in the first direction D1 and may extend along a right side of the first odd pixel region OPA1 toward the second direction D2.

The first odd pixel electrode OPE1 may be partially overlapped with the first storage line ST1 and the first and second branch electrodes BR1 and BR2 to constitute the first odd storage capacitor OCs1 of FIG. 2. The first storage electrode portion may be applied with the storage voltage Vcom of FIG. 2.

The second storage electrode portion may include a third branch electrode BR3 and a fourth branch electrode BR4. The third branch electrode BR3 may extend along a left side of the second odd pixel region OPA2 toward the second direction D2, and the fourth branch electrode BR4 may be spaced apart from the third branch electrode BR3 in the first direction D1 and may extend along a right side of the second odd pixel region OPA2 toward the second direction D2.

The first to third odd transistors OT1-OT3 may be configured to have substantially the same stacking structure. Accordingly, for the sake of simplicity, the stacking structure of the third odd transistor OT3 will be exemplarily described with reference to FIG. 4.

Referring to FIG. 4, the LCD panel 400 may include an array substrate 410, a counter substrate 420 opposite to the array substrate 410, and a liquid crystal layer 430 disposed between the array substrate 410 and the counter substrate 420.

The counter substrate 420 may include an upper base substrate 421, the common electrode CE, a black matrix 422, and a color filter 423. The upper base substrate 421 may be configured to have high optical transmittance and may serve as a base of the counter substrate 420.

The LCD panel 400 may include a light-blocking region SA and a display region DA. In this case, the black matrix 422 may be provided on the upper base substrate 421 to cover the light-blocking region SA. The black matrix 422 may include an optically opaque material to block light to be incident into the light-blocking region SA. The color filter 423 may be provided to cover the black matrix 422 and may provide a filtering function for realizing a color light from light to be transmitted through the liquid crystal layer 430.

In an exemplary embodiment, the common electrode CE may include a transparent conductive material. In an exemplary embodiment, the common electrode CE may include at least one of transparent conductive materials, such as ITO, IZO, and ITZO. A shape, in a plan view, of the common electrode CE will be described with reference to FIG. 5.

The array substrate 410 may include a lower base substrate 411, the third odd transistor OT3, an insulating layer 412, and the second odd pixel electrode OPE2.

In an exemplary embodiment, the lower base substrate 411 may be configured to have high optical transmittance and may serve as a base of the array substrate 410. The third odd transistor OT3 may be provided on the lower base substrate 411 and in the light-blocking region SA. The first odd gate electrode OG1 may be provided on the lower base substrate 411.

The third odd transistor OT3 may further include a gate insulating layer GI for an electrical isolation between the third odd semiconductor layer OA3 and the third odd gate electrode OG3. The third odd semiconductor layer OA3 may be provided on the third odd gate electrode OG3, with the gate insulating layer GI interposed therebetween. The third odd source electrode OS3 may contact the third odd semiconductor layer OA3, and the third odd drain electrode OD3 may be spaced apart from the third odd source electrode OS3 and may contact the third odd semiconductor layer OA3.

The insulating layer 412 may be disposed on the third odd transistor OT3. In an exemplary embodiment, the insulating layer 412 may include an inorganic material and/or an organic material. A third contact hole H3 may be defined in the insulating layer 412 to expose the third odd drain electrode OD3 through the insulating layer 412. The third contact hole H3 may be disposed on the light-blocking region SA.

The second odd pixel electrode OPE2 may be provided on the insulating layer 412 and may be electrically connected to the third odd drain electrode OD3 through the third contact hole H3.

The liquid crystal layer 430 may control an intensity of light passing through the LCD panel 400. In an exemplary embodiment, the liquid crystal layer 430 may include liquid crystal molecules with dielectric anisotropy. In the exemplar embodiment, the liquid crystal molecules may have a negative dielectric anisotropy, for example. Accordingly, when an electric field is applied to the liquid crystal molecules, the liquid crystal molecules may be arranged to have short axes parallel to the electric field. Further, the liquid crystal molecules may be aligned to be perpendicular to the array substrate 410 and the counter substrate 420 (i.e., in a homeotropic manner), for example.

Figure 5:
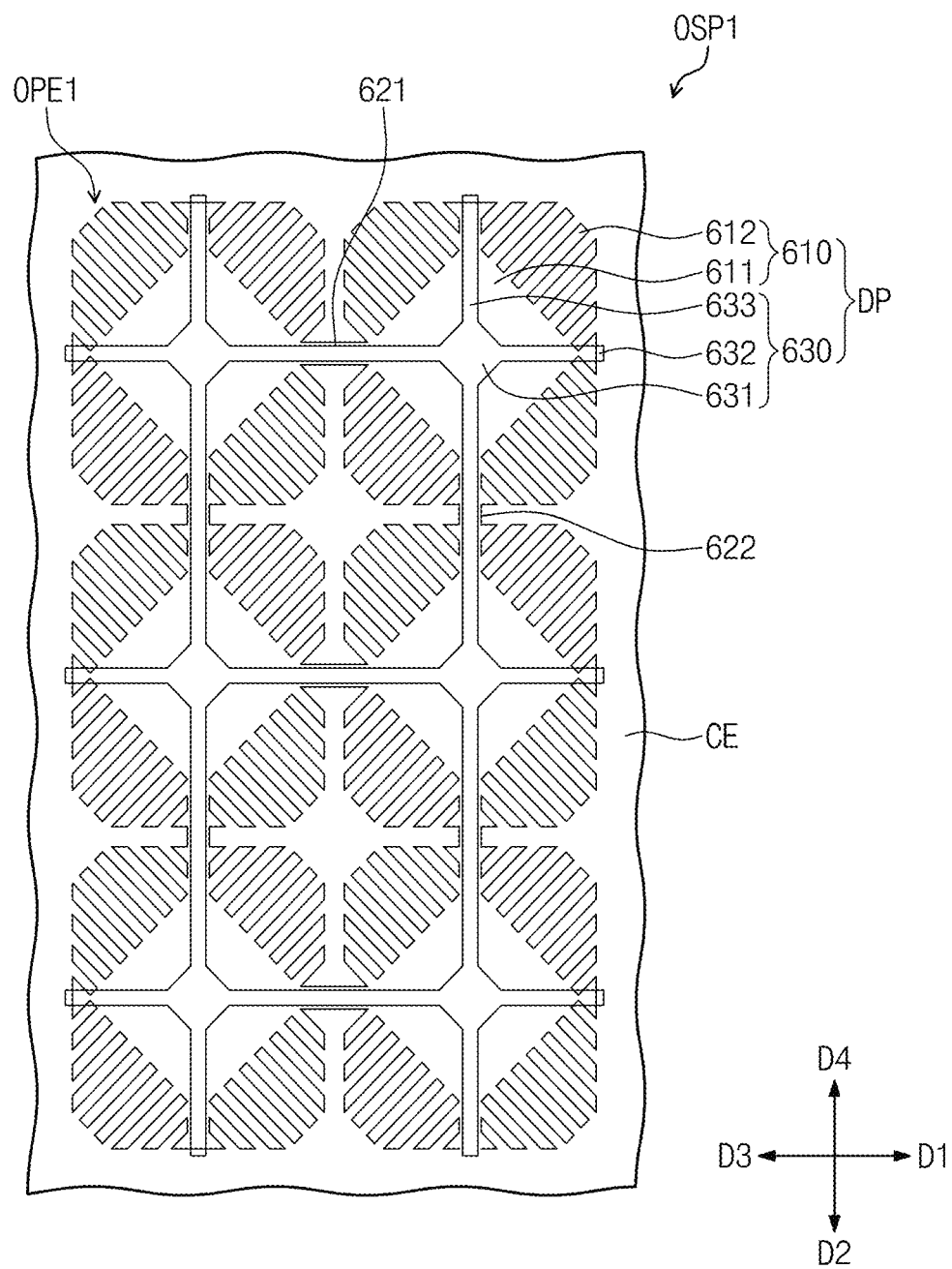
FIG. 5 is a plan view illustrating a first odd sub pixel illustrated in FIG. 3.

FIG. 5 is a plan view illustrating a first odd sub pixel illustrated in FIG. 3.

The first odd sub pixel OSP1 may include at least one domain pattern DP. In an exemplary embodiment, the first odd sub pixel OSP1 may include a plurality of the domain patterns DP. In detail, the first odd sub pixel OSP1 may include six domain patterns DP that are arranged in the form of three by two matrix having three rows and two columns.

Each of the domain patterns DP may include a pixel electrode pattern 610 provided on the first odd pixel electrode OPE1 and an opening pattern 630 provided in the common electrode CE.

The pixel electrode pattern 610 may include a central pattern portion 611 and a fine branch portion 612. In an exemplary embodiment, the central pattern portion 611 may be, for example, a diamond shape with four sides that are at an angle to the first and second directions D1 and D2. Each side of the central pattern portion 611 may be connected to a plurality of fine branch portions 612 that are arranged spaced apart from each other. In exemplary embodiments, each of the fine branch portions 612 may extend outward from and orthogonally to a corresponding side of the four sides of the central pattern portion 611.

The first odd pixel electrode OPE1 may further include a horizontal connecting portion 621 and a vertical connecting portion 622. The horizontal connecting portion 621 may electrically connect a pair of pixel electrode patterns 610 that are disposed adjacent to each other in the first direction D1. In an exemplary embodiment, the horizontal connecting portion 621 may be disposed between the pixel electrode patterns 610 in the same row to electrically connect the pixel electrode patterns 610 to each other. The horizontal connecting portion 621 may extend along the first direction D1. Further, the vertical connecting portion 622 may be disposed between the pixel electrode patterns 610 in the same column to electrically connect the pixel electrode patterns 610 to each other. The vertical connecting portion 622 may extend along the second direction D2.

The opening pattern 630 may have a central opening 631, a horizontal opening 632, and a vertical opening 633. The central opening 631 may have a shape similar to that of the central pattern portion 611. In an exemplary embodiment, similar to the central pattern portion 611, the central opening 631 may be a diamond shape with four sides that are at an angle to the first and second directions D1 and D2, for example. The horizontal opening 632 may extend from two corners of the central opening 631, which are positioned in the third and first directions D3 and D1, in a direction toward the third and first directions D3 and D1. The vertical opening 633 may extend from two corners of the central opening 631, which are positioned in the second and fourth directions D2 and D4, in a direction toward the second and fourth directions D2 and D4. Accordingly, the horizontal and vertical openings 632 and 633 may be intersected to each other at a center of the central opening 631 to provide a cross shape.

The horizontal opening 632 may be defined to connect a pair of the opening patterns 630 that are disposed adjacent to each other in the same row. Further, the vertical opening 633 may be provided to connect a pair of the opening patterns 630 that are disposed adjacent to each other in the same column.

The opening pattern 630 may be defined to be overlapped with the pixel electrode pattern 610. In an exemplary embodiment, a center of the central opening 631 shaped like a diamond may be disposed to be overlapped with a center of the central pattern portion 611 shaped like a diamond, for example. Further, the horizontal opening 632 may extend in such a way that it is overlapped with corners of the central pattern portion 611 positioned in the first and third directions D1 and D3, and the vertical opening 633 may extend in such a way that it is overlapped with corners of the central pattern portion 611 positioned in the second and fourth directions D2 and D4.

Figure 6:
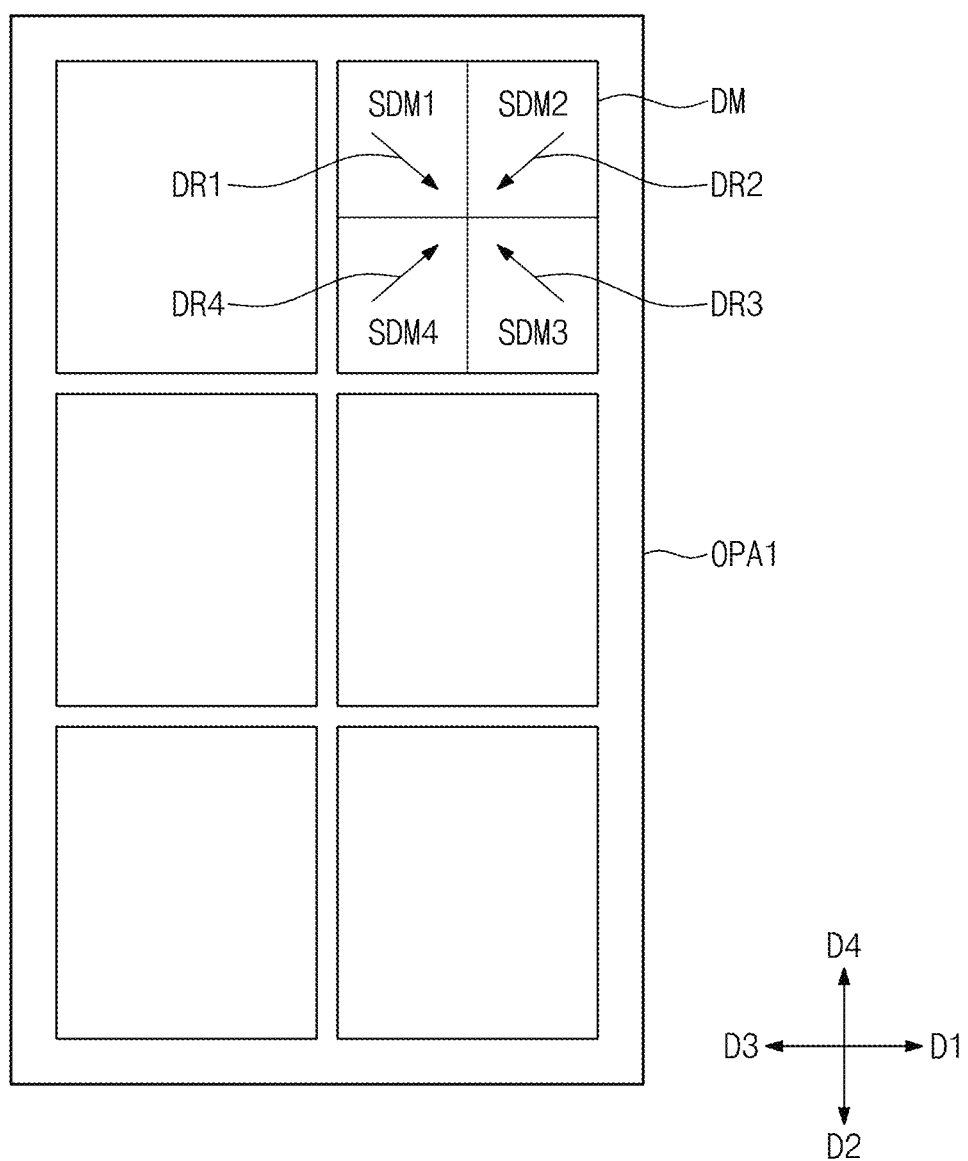
FIG. 6 is a plan view illustrating domains of a first odd sub pixel.

FIG. 6 is a plan view illustrating domains of a first odd sub pixel.

Referring to FIGS. 5 and 6, in the case where the first odd sub pixel OSP1 has the domain pattern DP, a domain DM may be defined in the first odd pixel region OPAL In an exemplary embodiment, the first odd pixel region OPA1 may include a plurality of domains DM. In this case, the plurality of domains DM may be arranged to correspond to the plurality of domain patterns DP. In detail, the plurality of domains DM may be provided in the first odd pixel region OPA1 to provide a three by two matrix having three rows and two columns, similar to the plurality of domain patterns DP having the three by two matrix arrangement.

Each domain DM may be sectioned into first to fourth sub domains SDM1-SDM4. In an exemplary embodiment, each of the first to fourth sub domains SDM1-SDM4 may be defined to have a rectangular shape, for example, as the result of the arrangement of the pixel electrode pattern 610 and the opening pattern 630.

In the case where the first odd pixel electrode OPE1 is applied with the first pixel voltage, liquid crystal molecules may be re-aligned by a fringe field. Depending on the shapes of the pixel electrode pattern 610 and the opening pattern 630, the fringe field in the first to fourth sub domains SDM1-SDM4 may have different directions from each other. Accordingly, re-alignment directions of the liquid crystal molecules may have a difference between the first to fourth sub domains SDM1-SDM4. In an exemplary embodiment, the liquid crystal molecules in the first to fourth sub domains SDM1-SDM4 may have the re-alignment directions that will be referred to as first to fourth alignment directions DR1-DR4, the first alignment direction DR1 may be parallel to a vector sum of the first and second directions D1 and D2, the second alignment direction DR2 may be parallel to a vector sum of the second and third directions D2 and D3, the third alignment direction DR3 may be parallel to a vector sum of the third and fourth directions D3 and D4, and the fourth alignment direction DR4 may be parallel to a vector sum of the first and fourth directions D1 and D4.

Since the liquid crystal molecules in the first to fourth sub domains SDM1-SDM4 have different re-alignment directions, the first odd sub pixel OSP1 can have an improved viewing angle property.

The second odd sub pixel OSP2 of FIG. 3 may also include at least one domain pattern DP. In exemplary embodiments, the first and second odd sub pixels OSP1 and OSP2 may be different from each other in terms of the number of the domain patterns DP provided thereon. In an exemplary embodiment, the second odd sub pixel OSP2 may include four domain patterns DP that are arranged in the form of two by two matrix having two rows and two columns. As described above, the domain pattern DP may include the first to fourth sub domains SDM1-SDM4, and the re-alignment directions of the liquid crystal molecules in the first to fourth sub domains SDM1-SDM4 may be different from each other. Thus, it possible to improve a viewing angle property of the second odd sub pixel OSP2.

Figure 7:
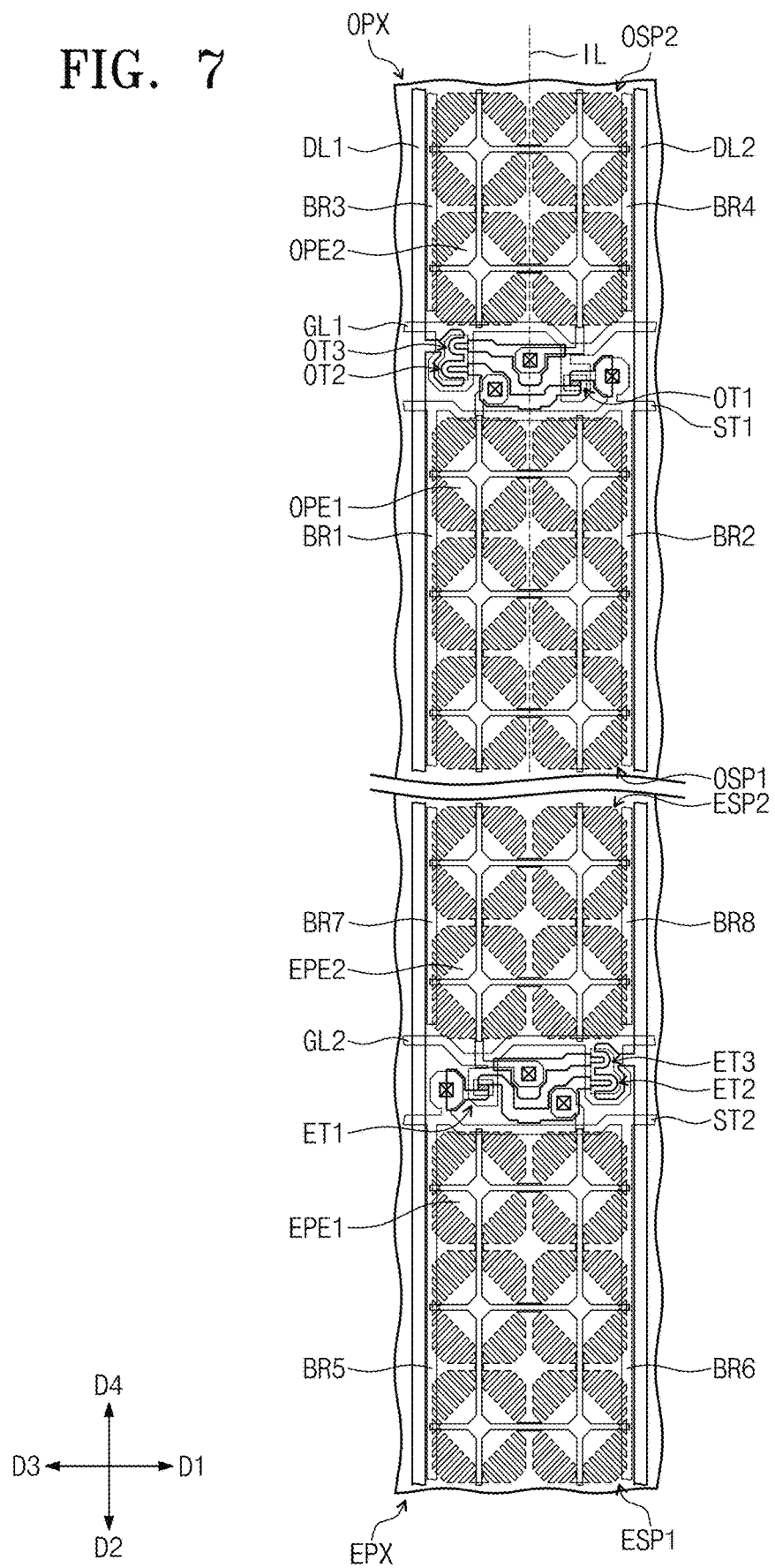
FIG. 7 is a plan view illustrating an exemplary embodiment of odd and even pixels according to the invention.
Figure 8:
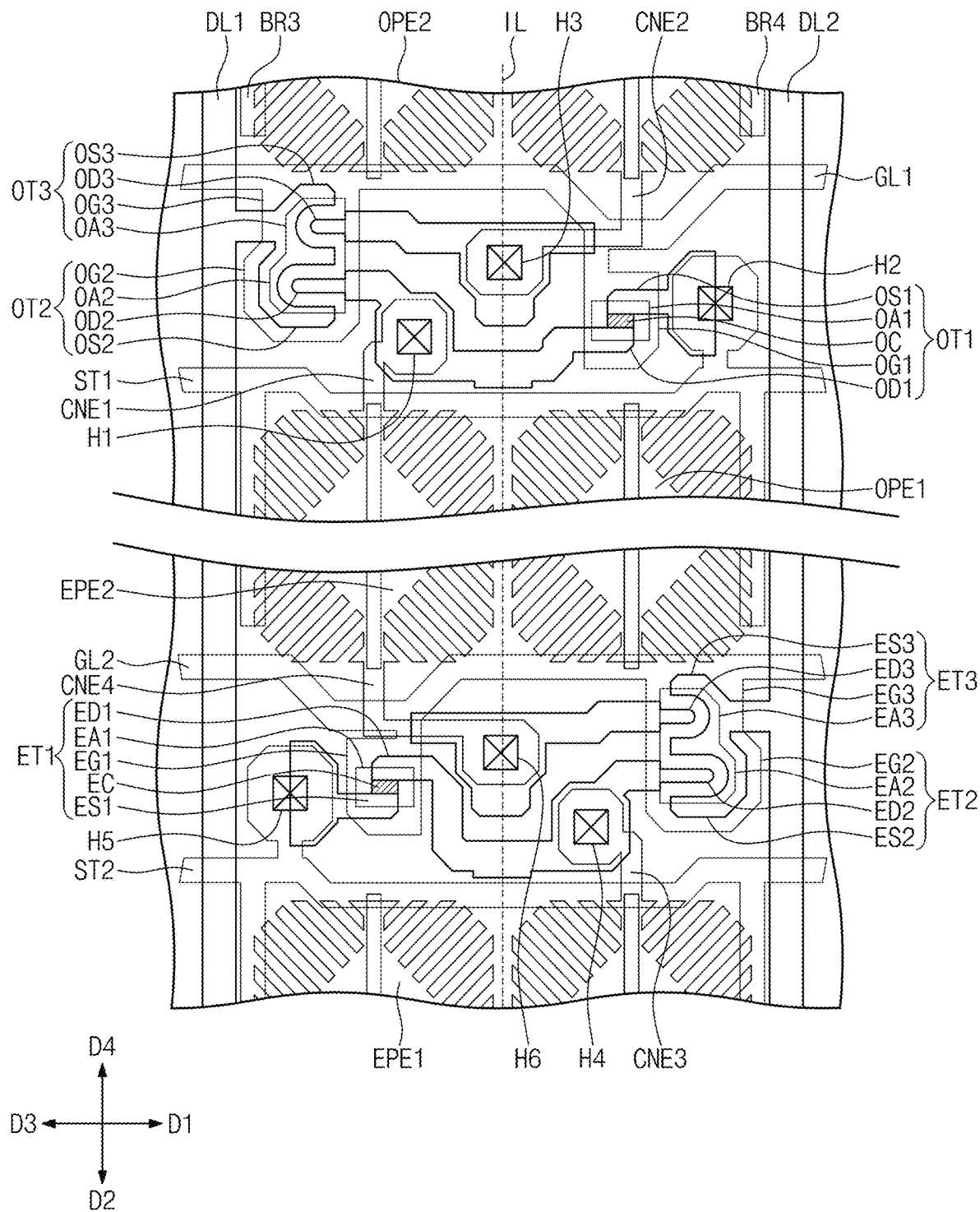
FIG. 8 is an enlarged plan view of first to third odd transistors and first to third even transistors shown in FIG. 7.

FIG. 7 is a plan view illustrating odd and even pixels according to exemplary embodiments of the invention, and FIG. 8 is an enlarged plan view of first to third odd transistors and first to third even transistors shown in FIG. 7.

Referring to FIGS. 7 and 8, the odd pixel OPX and the even pixel EPX may be disposed along the second direction D2.

The even pixel EPX may include a first even sub pixel ESP1 and a second even sub pixel ESP2. The first even sub pixel ESP1 may include a first even transistor ET1, a second even transistor ET2, a first even pixel electrode EPE1, and a third storage electrode portion. The second even sub pixel ESP2 may include a third even transistor ET3, a second even pixel electrode EPE2, and a fourth storage electrode portion.

When viewed in a plan view, a portion of the even pixel EPX other than the first even transistor ET1 and a portion of the odd pixel OPX other than the first odd transistor OT1 may have shapes that are substantially inversion symmetric with reference to virtual line IL that is parallel to the second direction D2 and passes through a center of the odd pixel OPX. In an exemplary embodiment, the portion of the even pixel EPX other than the first even transistor ET1, have a shape that is obtained by rotating the shape of the portion of the odd pixel OPX other than the first odd transistor OT1 by 180 degrees, for example.

According to exemplary embodiments of the invention, the first even pixel electrode EPE1 may have the same shape as the first odd pixel electrode OPE1, and the second even pixel electrode EPE2 may have the same shape as the second odd pixel electrode OPE2 of the odd pixel OPX. Accordingly, for the sake of brevity, an overlapping description of the first and second even pixel electrodes EPE1 and EPE2 is omitted.

The third storage electrode portion may include a second storage line ST2, a fifth branch electrode BR5, and a sixth branch electrode BR6. Each of the second storage line ST2, the fifth branch electrode BR5, and the sixth branch electrode BR6 may be provided to have the same shape as a corresponding shape of the first storage line ST1 of the odd pixel OPX, the first branch electrode BR1, and the second branch electrode BR2. Accordingly, for the sake of brevity, an overlapping description of the third storage electrode portion is omitted.

The fourth storage electrode portion may include a seventh branch electrode BR7 and an eighth branch electrode BR8. The seventh branch electrode BR7 and the eighth branch electrode BR8 may be provided to have the same shape as a corresponding shape of the third branch electrode BR3 and the fourth branch electrode BR4. In an exemplary embodiment, the seventh and eighth branch electrodes BR7 and BR8 may extend from the first and second branch electrodes BR1 and BR2 of the odd pixel OPX, respectively. Accordingly, for the sake of brevity, an overlapping description of the fourth storage electrode portion is omitted.

The first odd transistor OT1 may be disposed adjacent to the second data line DL2, and the second and third odd transistors OT2 and OT3 may be disposed adjacent to the first data line DL1.

The first odd transistor OT1 may further include a first odd semiconductor layer OA1 disposed adjacent to the second data line DL2. Further, the second and third odd transistors OT2 and OT3 may include second and third odd semiconductor layers OA2 and OA3, respectively, which are disposed adjacent to the first data line DL1. In an exemplary embodiment, the third odd semiconductor layer OA3 may be provided to extend from the second odd semiconductor layer OA2 toward the fourth direction D4.

The second odd gate electrode OG2 may diverge from the first gate line GL1 toward the second direction D2 and may be overlapped with the second odd semiconductor layer OA2. The second odd source electrode OS2 may diverge from the first data line DL1 toward the first direction D1 and may be overlapped with the second odd semiconductor layer OA2. The second odd source electrode OS2 may have a letter "U" shape that is clockwise rotated by 90 degrees.

The second odd drain electrode OD2 may include an end portion that is overlapped with the second odd semiconductor layer OA2. The channel defined in the second odd semiconductor layer OA2 may have a letter "U" shape that is clockwise rotated by 90 degrees and thereby have geometric correspondence to the second odd source electrode OS2 and the second odd drain electrode OD2.

The second odd drain electrode OD2 may include another end portion that extends from the end portion thereof toward the first direction D1 and is connected to the first odd pixel electrode OPE1. In an exemplary embodiment, another end portion of the second odd drain electrode OD2 may be electrically connected to a first connection electrode CNE1 (refer to FIG. 8) through a first contact hole H1. Here, the first connection electrode CNE1 may be provided to diverge from the first odd pixel electrode OPE1 and extend toward the first contact hole H1.

The first odd gate electrode OG1 may diverge from the first gate line GL1 toward the second direction D2 and may be overlapped with the first odd semiconductor layer OA1. An end portion of the first odd source electrode OS1 may be electrically connected to the first storage line ST1 through a second contact hole H2, and another end portion of the first odd source electrode OS1 may extend from the end portion of the first odd source electrode OS1 toward the third direction D3 and may be overlapped with the first odd semiconductor layer OA1.

The first odd drain electrode OD1 may be spaced apart from the first odd source electrode OS1 in the second direction D2. The first odd drain electrode OD1 may have an end portion, which is overlapped with the first odd semiconductor layer OA1, and another end portion, which extends from the end portion thereof toward the third direction D3 and is connected to the second odd drain electrode OD2.

An odd channel OC defined in the first odd semiconductor layer OA' may have a letter "I" shape extending toward the first direction D1 and thereby have geometric correspondence to the first odd source electrode OS1 and the first odd drain electrode OD1. In other words, the odd channel OC may have an 'I'-shape extending toward the first direction.

The third odd gate electrode OG3 may diverge from the first gate line GL1 toward the second direction D2 and may be overlapped with the third odd semiconductor layer OA3. The third odd source electrode OS3 may diverge from the first data line DL1 toward the first direction D1 and may be overlapped with the third odd semiconductor layer OA3. The third odd source electrode OS3 may have a letter "U" shape that is clockwise rotated by 90 degrees.

The third odd drain electrode OD3 may include an end portion that is overlapped with the third odd semiconductor layer OA3. The channel defined in the third odd semiconductor layer OA3 may have a letter "U" shape that is clockwise rotated by 90 degrees and thereby have geometric correspondence to the third odd source electrode OS3 and the third odd drain electrode OD3.

The third odd drain electrode OD3 may include another end portion that extends from the end portion thereof toward the first direction D1 and is connected to the second odd pixel electrode OPE2. In an exemplary embodiment, another end portion of the third odd drain electrode OD3 may be electrically connected to a second connection electrode CNE2 through a third contact hole H3. Here, the second connection electrode CNE2 may be provided to diverge from the second odd pixel electrode OPE2 and extend toward the third contact hole H3.

The first to third even transistors ET1-ET3 and the first to third odd transistors OT1-OT3 may be provided to have substantially inversion symmetry with reference to the virtual line IL. In an exemplary embodiment, the first even transistor ET1 may be disposed adjacent to the second data line DL2, and the second and third even transistors ET2 and ET3 may be disposed adjacent to the first data line DL1, for example.

The second even transistor ET2 may include a second even gate electrode EG2, a second even semiconductor layer EA2, a second even source electrode ES2, and a second even drain electrode ED2. The second even semiconductor layer EA2 may be disposed adjacent to the second data line DL2.

The second even transistor ET2 and the second odd transistor OT2 may be provided to have substantially inversion symmetry with reference to the virtual line IL. In an exemplary embodiment, the second even gate electrode EG2 may diverge from the second gate line GL2 toward the second direction D2 and may be overlapped with the second even semiconductor layer EA2. The second even source electrode ES2 may diverge from the second data line DL2 toward the third direction D3 and may be overlapped with the second even semiconductor layer EA2. The second even drain electrode ED2 may include an end portion, which is overlapped with the second even semiconductor layer EA2, and another end portion, which extends from the end portion thereof toward the third direction D3 and is connected to the first even pixel electrode EPE1. In an exemplary embodiment, another end portion of the second even drain electrode ED2 may be electrically connected to a third connection electrode CNE3 through a fourth contact hole H4. Here, the third connection electrode CNE3 may be provided to diverge from the first even pixel electrode EPE1 and extend toward the fourth contact hole H4.

The first even transistor ET1 may include a first even gate electrode EG1, a first even semiconductor layer EA1, a first even source electrode ES1, and a first even drain electrode ED1. The first even semiconductor layer EA1 may be disposed adjacent to the first data line DL1.

The first even gate electrode EG1 may diverge from the second gate line GL2 toward the second direction D2 and may be overlapped with the first even semiconductor layer EA1.

An end portion of the first even source electrode ES1 may be electrically connected to the second storage line ST2 through a fifth contact hole H5, and another end portion of the first even source electrode ES1 may extend from the end portion thereof toward the first direction D1 and may be overlapped with the first even semiconductor layer EA1. The first even source electrode ES1 on the first even semiconductor layer EA1 may have substantially the same shape as that of the first odd drain electrode OD1 on the first odd semiconductor layer OA1.

The first even drain electrode ED1 may be spaced apart from the first even source electrode ES1 in the fourth direction D4. The first even drain electrode ED1 may have an end portion, which is overlapped with the first even semiconductor layer EA1, and another end portion, which extends from the end portion thereof toward the first direction D1 and is connected to the second even drain electrode ED2. The first even drain electrode ED1 on the first even semiconductor layer EA1 may have substantially the same shape as that of the first odd source electrode OS1 on the first odd semiconductor layer OA1.

An even channel EC defined in the first even semiconductor layer EA1 may have a letter "I" shape extending toward the first direction D1, and thereby have geometric correspondence to the first even source electrode ES1 and the first even drain electrode ED1. In other words, the even channel EC may have the 'I'-shape extending toward the first direction.

Since the first odd source and drain electrodes OS1 and OD1 on the first odd semiconductor layer OA1 have the same shapes as those of the first even source and drain electrodes ES1 and ED1 on the first even semiconductor layer EA1, the odd channel OC may have the same shape as that of the even channel EC, when viewed in a plan view.

The third even transistor ET3 may include a third even gate electrode EG3, a third even semiconductor layer EA3, a third even source electrode ES3, and a third even drain electrode ED3. The third even semiconductor layer EA3 may be disposed adjacent to the second data line DL2 and may be spaced apart from the second even semiconductor layer EA2 in the fourth direction D4.

The third even transistor ET3 and the third odd transistor OT3 may be provided to have substantially inversion symmetry with reference to the virtual line IL. In an exemplary embodiment, the third even gate electrode EG3 may diverge from the second gate line GL2 toward the second direction D2 and may be overlapped with the third even semiconductor layer EA3, and the third even source electrode ES3 may diverge from the second data line DL2 toward the third direction D3 and may be overlapped with the third even semiconductor layer EA3. The third even drain electrode ED3 may include an end portion, which is overlapped with the third even semiconductor layer EA3, and another end portion, which extends from the end portion thereof toward the third direction D3 and is connected to the second even pixel electrode EPE2. In an exemplary embodiment, another end portion of the third even drain electrode ED3 may be electrically connected to a fourth connection electrode CNE4 through a sixth contact hole H6. Here, fourth connection electrode CNE4 may diverge and extend from the second even pixel electrode EPE2 to the sixth contact hole H6.

In the case where there is a difference in shape between the odd channel OC and the even channel EC, a distribution voltage provided to the first odd sub pixel OSP1 through the first odd transistor OT1 may become different from a distribution voltage provided to the first even sub pixel ESP1 through the first even transistor ET1.

In this case, even when the first odd and even transistors OT1 and ET1 are applied with the same data voltage, there may be a difference in gradation between the first odd and even sub pixels OSP1 and ESP1. Since the odd pixel OPX is disposed in an odd-numbered row and the even pixel EPX is disposed in an even-numbered row, the difference in gradation between the first odd and even transistors OT1 and ET1 may lead to an unallowable difference in gradation between adjacent rows of the LCD panel 400 (hereinafter, referred to as a horizontal line failure).

A variation in shape between the odd channel OC and the even channel EC may result from a process variation in patterning processes for providing the first odd transistor OT1 and first even transistor ET1. The patterning process may include, for example, an exposure process.

In sum, when viewed in a plan view, the even channel EC may have the same shape as that of the odd channel OC. Further, since the odd pixel OPX and the even pixel EPX are arranged to have the staggered structure, the even pixel EPX, except for the first even transistor ET1, may have substantially inversion symmetry with the odd pixel OPX with reference to the virtual line IL, when viewed in a plan view.

In the case where the channels of the first odd and even transistors OT1 and ET1 are the same shape, a variation in shape of the odd channel OC can become equivalent to that of the even channel EC, even when the first odd and even transistors OT1 and ET1 are provided to have a difference in shape, because of the process variation in the patterning process. Accordingly, it is possible to effectively reduce horizontal line failure, which may result from the difference in shape between the odd channel OC and the even channel EC.

Hereinafter, this will be described in more detail with reference to FIG. 9.

Figure 9:
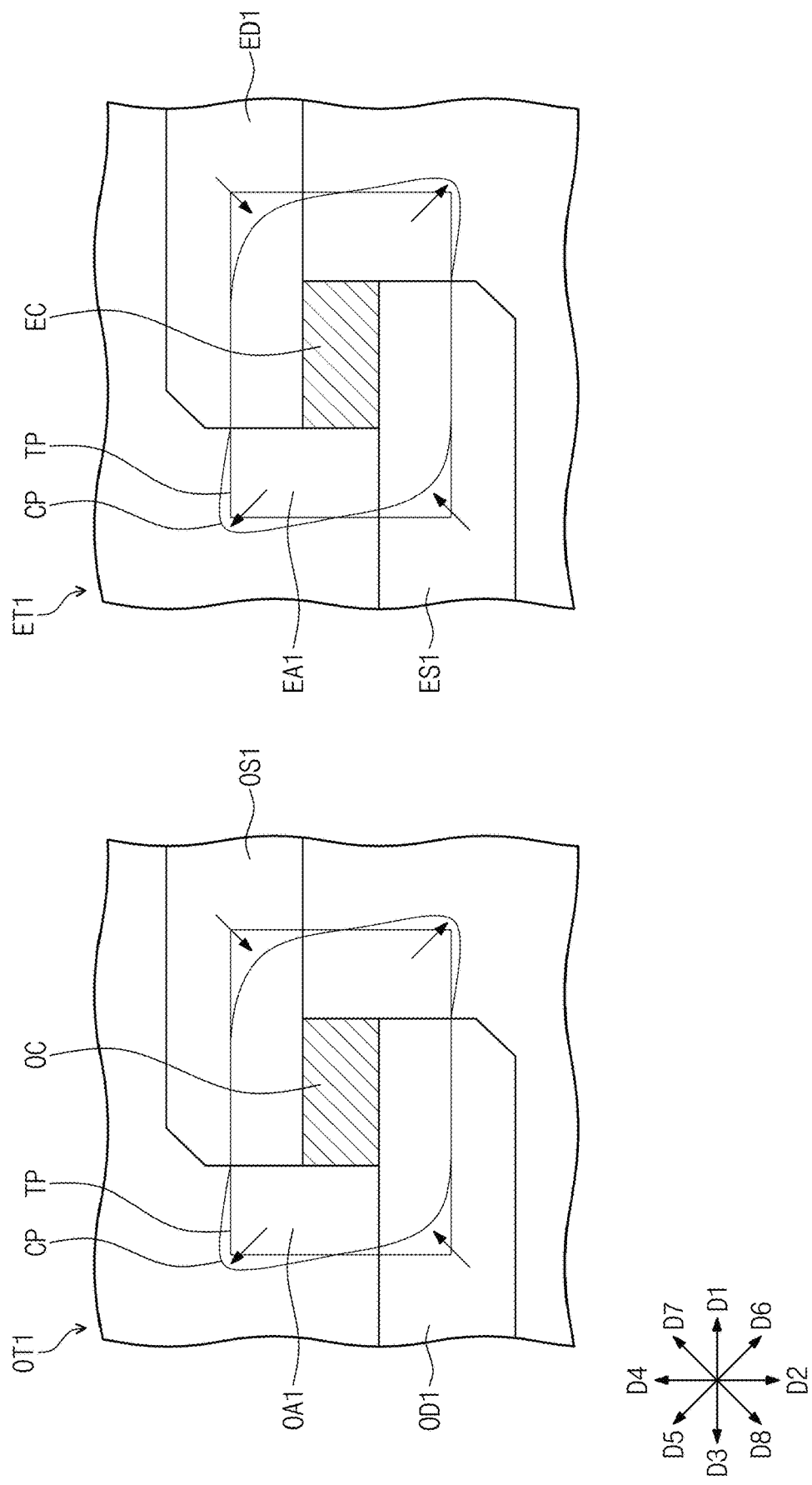
FIG. 9 is an enlarged plan view illustrating first odd and even transistors shown in FIG. 7.

FIG. 9 is an enlarged plan view illustrating first odd and even transistors shown in FIG. 7.

In an exemplary embodiment, the process for pattering the first odd and even transistors OT1 and ET1 may include an exposure process with, for example, a non-linear property. In an exemplary embodiment, due to the non-linear property in the exposure process, the resulting pattern provided using the exposure process may have a shape that is different from a desired shape (for example, elongated or enlarged in a specific direction). By contrast, due to the non-linear property in the exposure process, the resulting pattern provided using the exposure process may be contracted or shrunken in a specific direction, compared with the desired shape.

In an exemplary embodiment, the resulting pattern provided using the exposure process may be defined in such a way that its shape is elongated or enlarged in a fifth direction D5, which is parallel to a vector sum of the third and fourth directions D3 and D4, and in a sixth direction D6 antiparallel to the fifth direction D5 and is contracted or shrunken in a seventh direction D7 orthogonal to the fifth direction D5 and in an eighth direction D8 antiparallel to the seventh direction D7, compared with a desired shape of a target pattern TP.

In this case, when compared with the target pattern TP, the first odd semiconductor layer OA1 may include a changed pattern CP that is elongated in the fifth and sixth directions D5 and D6 and is shrunken in the seventh and eighth directions D7 and D8. Accordingly, as the result of the change in the shape of the first odd semiconductor layer OA1, the odd channel OC may have an increased width, and such an increased width of the odd channel OC may lead to not only a change in property of the first odd transistor OT1 but also a change in a magnitude of the distribution voltage that is dependent on the property of the first odd transistor OT1.

Since the first even and odd semiconductor layers EA1 and OA1 are provided using the same process, the first even semiconductor layer EA1 may also include the changed pattern CP, whose shape is different from an intended shape of the target pattern TP.

Accordingly, as the result of the change in the shape of the first even semiconductor layer EA1, the even channel EC may have an increased width, and such an increased width of the even channel EC may lead to not only a change in property of the first even transistor ET1 but also a change in a magnitude of the distribution voltage that is dependent on the property of the first even transistor ET1.

Nevertheless, since the odd channel OC has the same shape as that of the even channel EC, the shapes of the odd channel OC and the even channel EC may be changed in the same manner or by the same amount. That is, it is possible to effectively reduce a difference in shape of the odd and even channels OC and EC, which may result from the non-linearity (e.g., the process variation) in the exposure process, and thereby to prevent the horizontal line failure from occurring in the LCD panel 400.

By contrast, according to the conventional technology, the first odd transistor OT1 is provided to have a shape that is obtained by inverting the shape of the first even transistor ET1 with respect to the virtual line IL. In this case, due to the nonlinearity in the exposure process, one of a width of the first odd semiconductor layer OA1 and a width of the channel of the first even transistor ET1 increases, and the other decreases. This leads to the horizontal line failure.

Figure 10:
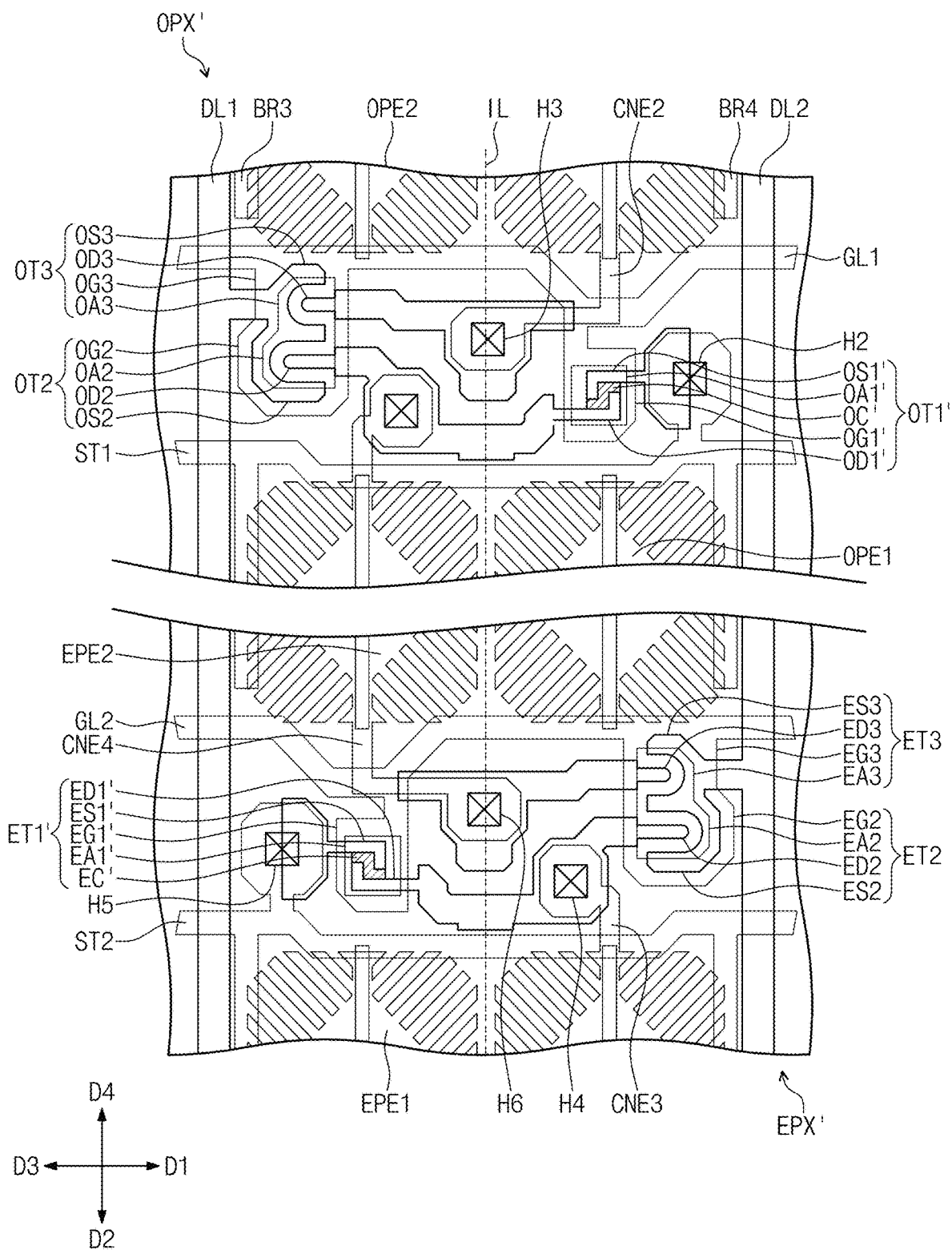
FIG. 10 is a plan view illustrating another exemplary embodiment of odd and even pixels according to the invention.
Figure 11:
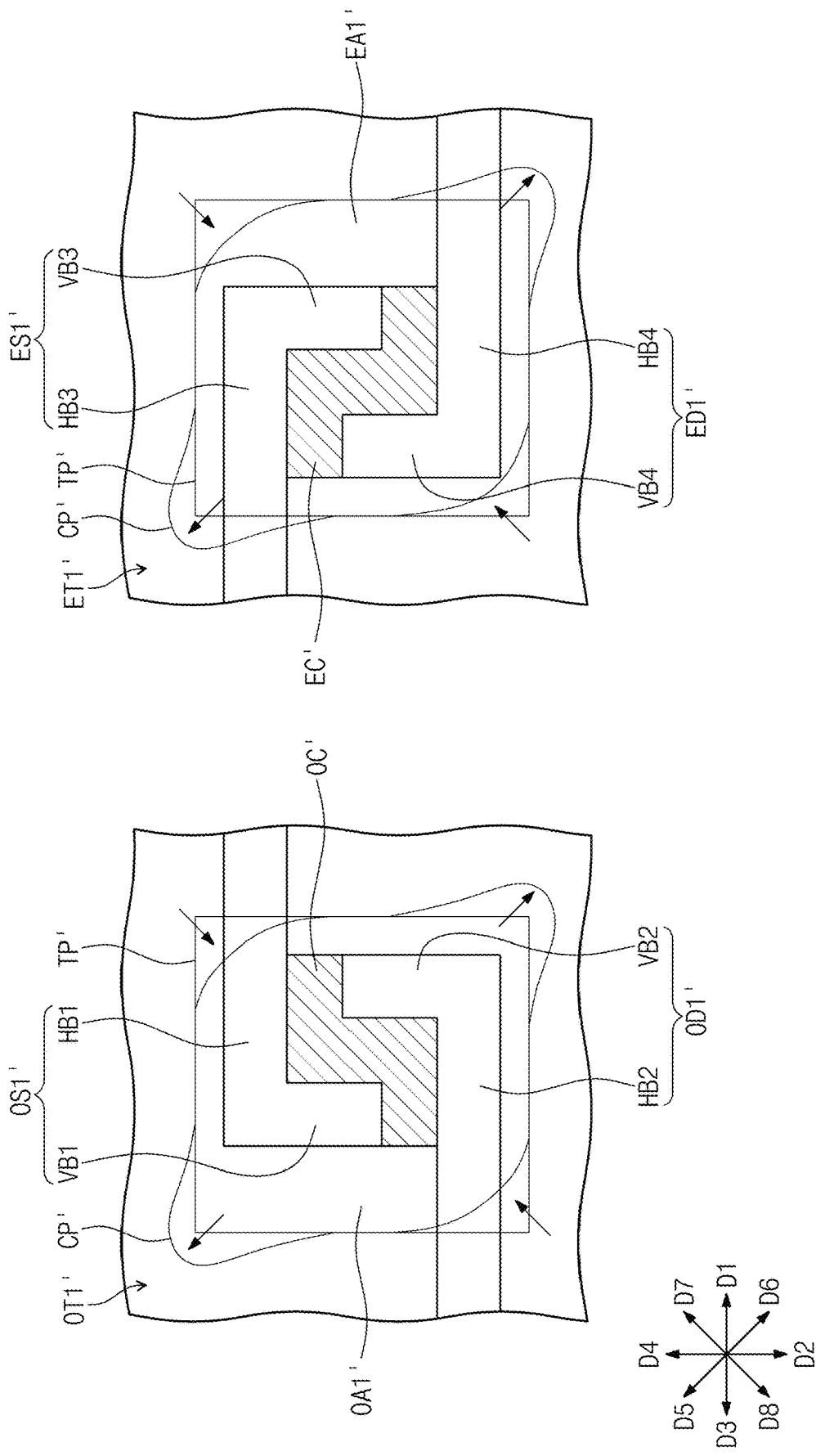
FIG. 11 is an enlarged plan view illustrating first odd and even transistors shown in FIG. 10.

FIG. 10 is a plan view illustrating odd and even pixels according to other exemplary embodiments of the invention, and FIG. 11 is an enlarged plan view illustrating first odd and even transistors shown in FIG. 10.

Referring to FIGS. 10 and 11, an odd pixel OPX' may include a first odd transistor OT1', and an even pixel EPX' may include a first even transistor ET1'. The odd pixel OPX', except for the first odd transistor OT1', may be configured to have the same features as those of the odd pixel OPX described with reference to FIG. 7, and the even pixel EPX', except for the first even transistor ET1', may be configured to have the same features as those of the even pixel EPX described with reference to FIG. 7. For convenience in description, the aforesaid technical features may be omitted below.

The first odd transistor OT1' may include a first odd semiconductor layer OA1', a first odd source electrode OS1', and a first odd drain electrode OD1'.

The first odd source electrode OS1' may include a first horizontal branch portion HB1 extending toward the third direction D3 and a first vertical branch portion VB1 extending toward the second direction D2.

The first horizontal branch portion HB1 may include an end portion, which is electrically connected to the first storage line ST1 via the second contact hole H2, and another end portion, which extends from the end portion thereof toward the third direction D3 and is overlapped with the first odd semiconductor layer OA1'. The first vertical branch portion VB1 may be overlapped with the first odd semiconductor layer OAF and may have an end portion, which extend from another end portion of the first horizontal branch portion HB1 toward the second direction D2.

The first odd drain electrode OD1' may include a second horizontal branch portion HB2 extending toward the first direction D1 and a second vertical branch portion VB2 extending toward the fourth direction D4.

The second horizontal branch portion HB2 may include an end portion, which is electrically connected to the second odd drain electrode OD2, and another end portion, which extends from the end portion thereof toward the first direction D1 and is overlapped with the first odd semiconductor layer OAF. The second vertical branch portion VB2 may be overlapped with the first odd semiconductor layer OAF and may have an end portion, which extends from another end portion of the second horizontal branch portion HB2 toward the fourth direction D4.

In sum, the first odd source electrode OS1' may have an 'L'-shaped structure that is clockwise rotated by 90 degrees, and the first odd drain electrode OD1' may have an 'L'-shaped structure that is counterclockwise rotated by 90 degrees and is engaged with the first odd source electrode OS1'. Accordingly, a channel OC' defined in the first odd semiconductor layer OA1' may have a letter 'S' shape that is defined by the first odd source and drain electrodes OS1' and OD1'.

The first even transistor ET1' may include a first even semiconductor layer EA1', a first even source electrode ES1', and a first even drain electrode ED1'.

The first even source electrode ES1' may include a third horizontal branch portion HB3 extending toward the first direction D1 and a third vertical branch portion VB3 extending toward the second direction D2.

The third horizontal branch portion HB3 may include an end portion, which is electrically connected to the second storage line ST2 through the fifth contact hole H5, and another end portion, which extends from the end portion thereof toward the first direction D1 and is overlapped with the first even semiconductor layer EA1'. The third vertical branch portion VB3 may be overlapped with the first even semiconductor layer EA1' and may have an end portion, which extends from another end portion of the third horizontal branch portion HB3 toward the second direction D2.

The first even drain electrode ED1' may include a fourth horizontal branch portion HB4 extending toward the first direction D1 and a fourth vertical branch portion VB4 extending toward the fourth direction D4.

The fourth horizontal branch portion HB4 may include an end portion, which is electrically connected to the second even drain electrode ED2, and another end portion, which extends from the end portion thereof toward the third direction D3 and is overlapped with the first even semiconductor layer EA1'. The fourth vertical branch portion VB4 may be overlapped with the first even semiconductor layer EA1' and may have an end portion, which extends from another end portion of the fourth horizontal branch portion HB4 toward the fourth direction D4.

As described above, the first even source electrode ES1' may have an 'L'-shaped structure that is horizontally inverted and is counterclockwise rotated by 90 degrees, and the first even drain electrode ED1' may have an 'L'-shaped structure that is horizontally inverted and clockwise rotated by 90 degrees and is engaged with the first even source electrode ES1'. Accordingly, a channel EC' defined in the first even semiconductor layer EA1' may have a letter 'S' shape that is defined by the first even source electrode ES1' and the first even drain electrode ED1'.

In an exemplary embodiment, the process for pattering the first odd and even transistors OT1' and ET1' may include an exposure process with, for example, the non-linear property. Accordingly, each of the first odd and even semiconductor layers OA1' and EA1' may include the changed pattern CP', whose shape is different from that of the target pattern TP'.

However, in the case where, due to the above structures of the first odd source and drain electrodes OS1' and OD1', the odd channel OC' is shaped like the letter 'S', the shape of the odd channel OC' may not be dependent on the shape of the first odd semiconductor layer OA1'.

Similarly, in the case where due to the above structures of the first even source and drain electrodes ES1' and ED1', the even channel EC' has a horizontally-inverted shape of the letter 'S', the shape of the even channel EC' may not be dependent on the shape of the first even semiconductor layer EA1'.

As a result, even when there is a process variation such as non-linearity in the exposure process, it is possible to prevent the shapes of the odd and even channels OC and EC from being changed and thereby to effectively reduce the horizontal line failure.

According to exemplary embodiments of the invention, an LCD panel may include odd and even pixels arranged to have a staggered structure. First odd and even transistors, which are provided in the odd and even pixels, respectively, may be defined in such a way that their channels have the same shape, when viewed in a plan view. Accordingly, the first odd transistor can be defined in such a way that a variation in shape of the channel thereof is the same as that of the first even transistor, even in the case that a difference in shape between the first odd and even transistors results from a process variation in a process of fabricating the first odd and even transistors. That is, it is possible to prevent the odd and even pixels from having a difference in gradation, which may be caused by a difference in channel shape between the first odd and even transistors, and the LCD panel can exhibit effectively reduced horizontal line failure.

While exemplary embodiments of the inventions have been particularly shown and described, it will be understood by one of ordinary skill in the art that variations in form and detail may be made therein without departing from the spirit and scope of the attached claims.

What is claimed is:

1. A liquid crystal display panel, comprising:
first and second data lines which are spaced apart from each other in a first direction, and extend along a second direction perpendicular to the first direction;

first and second gate lines which are spaced apart from each other in the second direction, and extend along the first direction;

an odd pixel which is interposed between the first and second data lines, connected to the first gate line and the first data line, and comprises a first odd transistor including a first odd source electrode and a first odd drain electrode; and an even pixel which is interposed between the first and second data lines, connected to the second gate line and the second data line, and comprises a first even transistor including a first even source electrode and a first even drain electrode, wherein the first odd source electrode comprises a first horizontal branch portion extending along the first direction and a first vertical branch portion extending from an end portion of the first horizontal branch portion toward the first odd drain electrode, the first odd drain electrode comprises a second horizontal branch portion extending along the first direction and a second vertical branch portion extending from an end portion of the second horizontal branch portion toward the first odd source electrode, the first even source electrode comprises a third horizontal branch portion extending toward the first direction and a third vertical branch portion extending from an end portion of the third horizontal branch portion toward the first even drain electrode, and the first even drain electrode comprises a fourth horizontal branch portion extending along the first direction and a fourth vertical branch portion extending from an end portion of the fourth horizontal branch portion toward the first even source electrode.

2. The liquid crystal display panel claim 1, wherein the first odd source electrode has an 'L'-shape structure which is clockwise rotated by 90 degrees, the first odd drain electrode has an 'L'-shaped structure which is counterclockwise rotated by 90 degrees and is engaged with the first odd source electrode, the first even source electrode has the 'L'-shaped structure which is horizontally inverted and is counterclockwise rotated by 90 degrees, and the first even drain electrode has the 'L'-shaped structure which is horizontally inverted and clockwise rotated by 90 degrees and is engaged with the first even source electrode.

3. The liquid crystal display panel of claim 1, wherein the odd pixel comprises:

a first odd sub pixel which receives a first data voltage from the first data line; and a second odd sub pixel which displays gradation lower than the first odd sub pixel and including the first odd transistor, the second odd sub pixel further comprises a second odd transistor electrically connected to the first gate line, the first data line and the first odd transistor, and the first odd transistor is electrically connected to the first gate line, a storage electrode and the second odd transistor, the even pixel comprises:

a first even sub pixel which receives a second data voltage from the second data line; and a second even sub pixel which displays gradation lower than the first even sub pixel and comprises the first even transistor, and a second even transistor electrically connected to the second gate line, the second data line and the first even transistor, and the first even transistor is electrically connected to the second gate line, the storage electrode and the second even transistor.

4. The liquid crystal display panel of claim 3, wherein the odd pixel further comprises a third odd transistor electrically connected to the first gate line, the first data line and the first odd sub pixel, and the even pixel further comprises a third even transistor electrically connected to the second gate line, the second data line and the first even sub pixel.

5. The liquid crystal display panel of claim 1, wherein the odd and even pixels are arranged along the second direction.

6. The liquid crystal display panel of claim 1, wherein the odd pixel is provided with a first data voltage through the first data line, the even pixel is provided with a second data voltage, whose polarity is opposite to that of the first data voltage, through the second data line, and the first and second data voltages are provided to the first and second data lines, respectively, in a column inversion mode.

7. The liquid crystal display panel of claim 1, further comprising:

an array substrate, a counter substrate facing the array substrate, and a liquid crystal layer which is interposed between the array substrate and the counter substrate, and comprises liquid crystal molecules with homeotropic alignment and negative dielectric anisotropy.

8. The liquid crystal display panel of claim 7, wherein each of the odd and even pixels comprises a pixel electrode with a pattern defining a plurality of domains, and alignment directions of the liquid crystal molecules are different between the plurality of domains.

* * * * *